United States Patent [19]

Godshalk

[11] 3,992,226

[45] Nov. 16, 1976

[54] ANTI-EXPLOSION CAP FOR STORAGE BATTERIES

[75] Inventor: James B. Godshalk, Yardley, Pa.

[73] Assignee: Ultra-Mold Corporation, Willow Grove, Pa.

[22] Filed: July 25, 1975

[21] Appl. No.: 598,742

[52] U.S. Cl.................................. 429/89; 220/367
[51] Int. Cl.² ............................................ H01M 2/12
[58] Field of Search ..................... 136/177; 220/367

[56] References Cited
UNITED STATES PATENTS

| | | | |
|---|---|---|---|
| 3,630,788 | 12/1971 | Hennen............................ | 136/177 |
| 3,879,227 | 4/1975 | Hennen............................ | 136/177 |
| 3,907,605 | 9/1975 | Melone............................. | 136/177 |

Primary Examiner—Donald L. Walton
Attorney, Agent, or Firm—Roylance, Abrams, Berdo & Kaul

[57] ABSTRACT

An inexpensive anti-explosion, anti-flame cap for openings in storage battery casings is formed, as by injection molding, from polymeric material in such fashion as to provide at least one critically dimensioned and located vent orifice effective to prevent establishment of a persistent flame at the orifice when hydrogen and oxygen are evolved during charging of the battery, and further effective to prevent propagation of flame through the orifice into the interior of the cap. Caps according to the invention also include internal mist chambers so arranged that liquid electrolyte is prevented from reaching the vent orifice or orifices and does not "pump through" the cap as a result of vibration of the storage battery in use.

23 Claims, 14 Drawing Figures

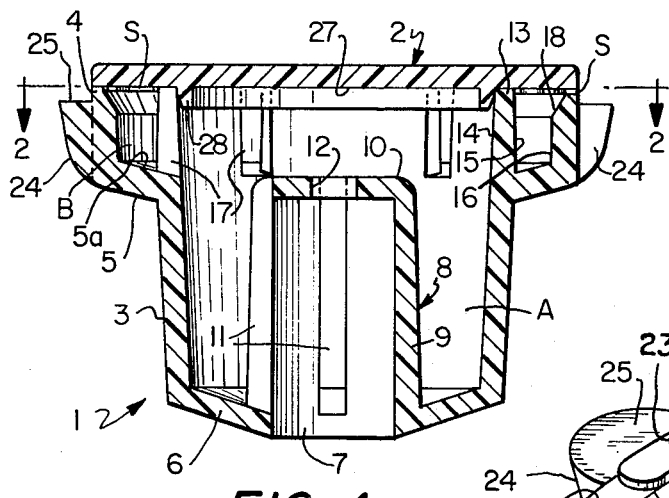
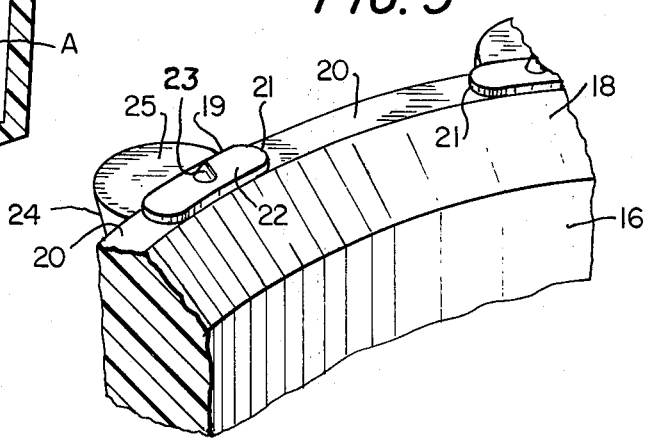
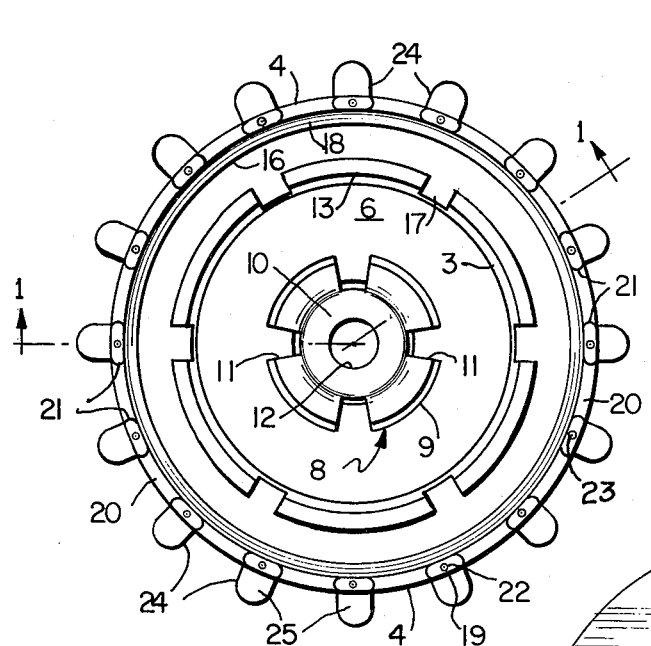
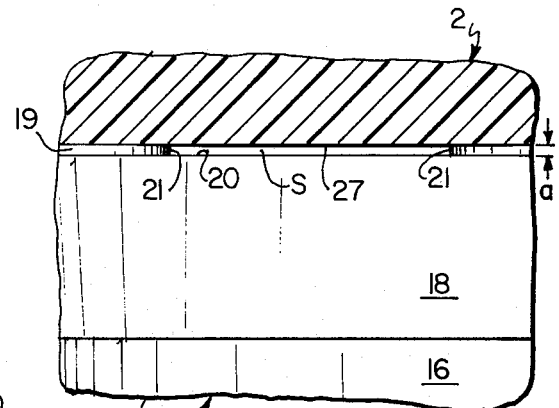
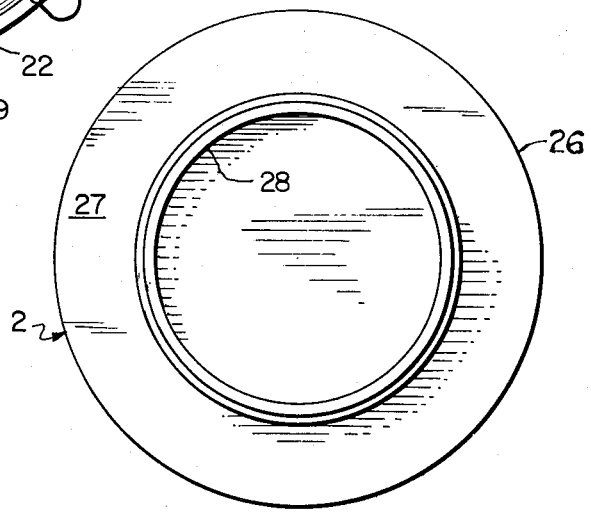
FIG. 1
FIG. 2
FIG. 3
FIG. 4
FIG. 5

ANTI-EXPLOSION CAP FOR STORAGE BATTERIES

BACKGROUND OF THE INVENTION

It has long been recognized that lead-acid storage batteries tend to emit hydrogen and oxygen while the battery is being charged and that the gases so emitted must be vented from the storage battery casing. Since storage batteries are used in environments where sparks occur, the usual automobile being a typical example, it is well known that venting of the hydrogen and oxygen from the battery causes a serious hazard of explosion. Prior-art workers have sought to provide special caps for the filling openings of the battery cells, for example, with the caps so designed as to vent the explosive gases to the atmosphere in a manner intended to minimize chances that an explosion would occur and also minimize chances that should an external explosion occur, the explosion could propagate through the vent cap into the interior of the cap and the battery. Many such vent caps have been proposed, typically including tortuous vent paths, relatively small vent apertures, and porous vent bodies such as membranes, ceramic plugs or sintered metal plugs. In recent times, the use of porous vent plugs has received considerable attention and such plugs have been effective to prevent flame from propagating back through the plug into the battery. Unfortunately, it has been found that such devices have the disadvantage of establishing persistent Bunsen burner-like flame, external to the plug, and that persistence of the flame generates such a high temperature as to e.g. melt the surrounding polymeric material in which the plug is mounted, so that the plug is blown from its mounting and explosion of the battery results.

Though flame behavior has not been explained to complete satisfaction in terms of chemical kinetics and transport properties of gas molecules, it is accepted that the flame established by burning a combustible gas mixture of given temperature, pressure and composition will not pass through an orifice smaller than a certain minimum size, commonly referred to as the "flame quenching distance". Research on this subject is reported in *The Quenching of Laminar Oxyhydrogen Flames By Solid Surfaces*, Raymond Friedman, Third Symposium on Combustion, Flame and Explosion Phenomena, Williams and Wilkens Company, Baltimore, Maryland, 1949, and *Survey of Hydrogen Combustion Properties*, Isadore L. Drell et al., 1958, NACA-TR-1383.

The flame quenching distance for a stoichiometric mixture of hydrogen and oxygen has been established as 0.0075 in. (0.019 cm.) under specific test conditions, and varying the relative proportions of hydrogen and oxygen does not appear to change the flame quenching distance dramatically. The flame quenching distance appears to be relatively independent of the material of which the elements defining the orifice are made.

Success of prior-art anti-explosion vent caps of the type employing porous ceramic plugs and the like can be explained by the fact that the capillary passages presented by the porous plug are of a transverse dimension smaller than the flame quenching distance for a mixture of hydrogen and oxygen, so that a flame cannot be propagated back through the plug into the battery. Failure of such devices, as a result of the heat caused by a persistent external flame, appears to be caused by the fact that, since the capillaries are immediately adjacent to each other and concentrated in a relatively small area, the hydrogen-oxygen mixture is emitted from the capillaries in a mode which is favorable to both ready ignition and persistent burning.

OBJECTS OF THE INVENTION

A general object of the invention is to devise a cap for storage battery openings which will be effective to prevent both explosions and persistent external flames, and will also trap electrolyte mist and prevent liquid electrolyte from pumping through the cap when the battery is subjected to vibration.

Another object is to provide such a cap which presents at least one small vent orifice, sized and arranged to vent the explosive gases from the battery without danger of persistent external flame or explosion, with the arrangement being such that the vent orifice or orifices are not subject to being plugged.

A further object is to provide such a cap which can be manufactured at very low cost without use of expensive materials or techniques.

SUMMARY OF THE INVENTION

The invention is based upon the discovery that, in order to vent the explosive gases from a storage battery without danger of a dangerously persistent flame or an explosion, it is not enough simply to pass the gases through an orifice or orifices dimensioned to provide the flame quenching distance which has been established for a hydrogen-oxygen mixture. Rather, it is also necessary to so provide the orifice or orifices as to present at least a minimum effective cross-sectional area and to direct the vented gases in a manner which will disperse the vented gases into the atmosphere. In its most advantageous forms, the invention provides a cap comprising a hollow body dimensioned to close the storage battery opening, the hollow body having a transverse wall with an opening communicating between the interior of the cap and the interior of the battery, there being means at the outer end of the hollow body defining at least one laterally directed vent orifice or aperture through which the gases emitted by the battery are constrained to flow, the at least one vent orifice having a maximum dimension axially of the cap which is significantly less than the flame quenching distance for a stoichiometric mixture of hydrogen and oxygen and a total effective cross-sectional area of at least 0.001 sq. in. (.645 sq. mm.). Best results are achieved when the at least one vent orifice is in the form of a plurality of slot-like openings spaced in a series extending circumferentially about the cap, so that the openings are directed radially with respect to the central axis of the cap, the maximum dimension of the slot-like openings in a direction axially of the cap being in the range of 0.003–0.005 in. (0.076–0.127 mm.). Alternatively, the cap can be formed with a continuous slot-like opening which extends completely around the cap. Caps according to the invention are formed, as by injection molding, from acid-resistant polymeric material, and comprise a generally tubular main body and a closure member secured to the outer end of the main body, the main body and closure member cooperating to define the laterally opening vent orifice or orifices.

In order that the manner in which the foregoing and other objects are achieved according to the invention can be understood in detail, particularly advantageous embodiments thereof will be described with reference to the accompanying drawings, which form a part of the original disclosure hereof, and wherein:

FIG. 1 is a vertical sectional view taken generally on line 1—1, FIG. 2, of a vent cap for storage battery filling openings according to one embodiment of the invention;

FIG. 2 is a top plan elevational view of the main body of the cap of FIG. 1, viewed generally on line 2—2, FIG. 1;

FIG. 3 is an enlarged fragmentary perspective view of a portion of the upper edge of the main body of FIG. 2;

FIG. 4 is an enlarged fragmentary view, partly in vertical section and partly in elevation, taken generally on line 4—4, FIG. 1;

FIG. 5 is a bottom plan view of the closure member employed in the vent cap of FIG. 1;

DETAILED DESCRIPTION OF THE EMBODIMENT OF FIGS. 1–5

Figure 6:
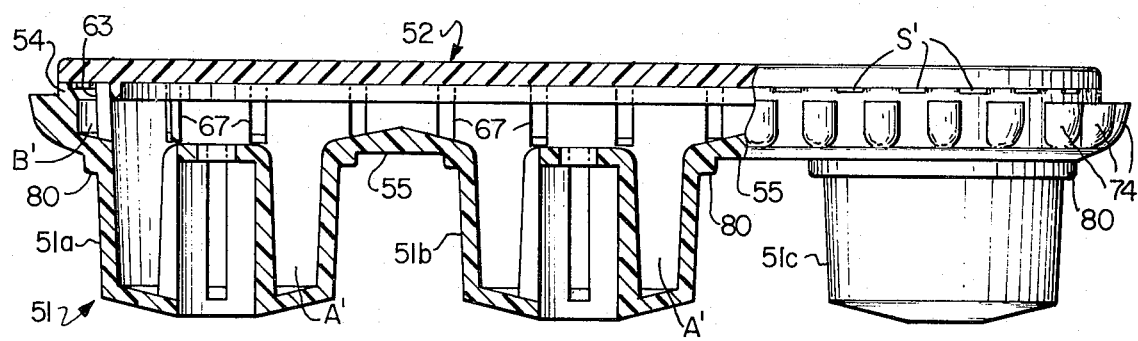
FIG. 6 is a view, partly in vertical section and partly in side elevation, of a ganged vent cap assembly for closing three filling openings of a storage battery.

FIGS. 1–5 illustrate a vent cap, according to one particularly advantageous embodiment of the invention, the cap being constructed to close a single filling opening of a conventional lead-acid storage battery (not shown). The cap comprises a main body 1 and a closure member 2, both members 1 and 2 being produced, advantageously by injection molding, from a suitable polymeric material which has high resistance to acid and good impact and tensile strengths.

Main body 1 is generally cup-shaped and includes an inner annular side wall portion 3 and an outer annular side wall portion 4 which is of substantially larger diameter than portion 3, portions 3 and 4 being joined by a generally transverse annular shoulder portion 5. At its inner end, side wall portion 3 is closed by a transverse wall 6 having a centrally located circular opening 7. Wall 6 is shallowly frusto-conical, slanting away from closure member 2 and toward the central axis of the cap. Formed integrally with wall 6 is an upstanding tubular portion 8 comprising a generally cylindrical side wall 9 and a transverse end wall 10. Side wall 9 is provided with a plurality of slots 11 which extend from wall 6 through end wall 10 and communicate between the interior of portion 8 and the annular space between that portion and the wall portion 3 of main body 1. End wall 10 is provided with a centrally located circular opening 12.

Main body 1 also includes an integrally formed, axially projecting annular partition 13 the inner surface 14 of which forms an outer extension of the inner surface of side wall portion 3. The outer surface 15 of partition 13 is spaced significantly inwardly from and is concentric with the generally cylindrical inner surface portion 16 of outer side wall portion 4. Partition 13 is provided with a plurality of axially extending slots 17 which extend from the frusto-conical surface 5a of shoulder portion 5 through the outer edge of the partition and communicate between the space between the partition and side wall portion 4, on the one hand, and the space enclosed by the partition and side wall portion 3, on the other hand.

As best seen in FIG. 3, the inner surface of side wall portion 4 includes, at the free end of the side wall portion, frusto-conical surface portion 18 which tapers away from closure member 2 and toward the axis of the cap, so that the radial dimension of the circular outer edge of side wall portion 4 is relatively small. This edge of side wall portion 4 is made up of a plurality of circumferentially spaced outwardly projecting pedestal portions 19 and a plurality of flat portions 20 each located between a different adjacent pair of the pedestal portions 19. Elongated circumferentially of side wall portion 4, pedestal portions 19 terminate in rounded ends 21 and have flat main surfaces 22, all of surfaces 22 lying in a common plane which is at right angles to the central axis of main body 1. At the center of each surface 22, before assembly of the cap, is a very small outwardly directed conical projection 23. All of the flat surfaces 20 lie in a common plane which is at right angles to the central axis of the main body portion. The common plane occupied by flat surfaces 22 of the pedestal portions is spaced from the common plane occupied by surfaces 20 by a small distance a, FIG. 4, which is significantly less than 0.007 in. (0.18 mm.) and is advantageously in the range 0.003–0.005 in. (0.076–0.13 mm.).

Outer wall portion 4 is provided with a plurality of circumferentially spaced radial projections 24 which have flat top surfaces 25 located in a common transverse plane spaced significantly from the plane occupied by surface portions 20. Projections 24 have rounded outer edges and curve inwardly and toward the central axis of the cap to blend into the surface of shoulder portion 5, as seen in FIG. 1. As will be clear from FIGS. 2 and 3, projections 24 are equal in number to the raised portions 19 of the outer edge of side wall portion 4 and each projection 24 is centered on a different one of the portions 19, the circumferential widths of projections 24 being approximately equal to the circumferential length of edge portions 19.

Comparing FIGS. 1 and 5, it will be seen that closure member 2 comprises a body 26 having a flat lower surface 27 which is interrupted only by an axially short, dependent circular skirt 28 having an outer diameter substantially equal to the inner diameter of partition 13 so that the skirt 28 is snugly embraced by the outer end portion of partition 13. Body 26 is circular and its diameter is equal to the outer diameter of wall portion 4.

For assembly, closure member 2 is put in place on main body portion 1, with skirt 28 inserted within partition 13, and with the peripheral portion of the bottom surface 27 of member 2 engaging all of the conical projections 23, FIG. 3. Using a conventional ultrasonic welding device, the combination of member 2 and the adjacent portions of member 1 are vibrated ultrasonically, with conical projections 23 acting as energy directors, so that the polymeric material of projections 23 are brought to a state of fusion, clamping pressure being applied conventionally by the ultrasonic welding device, and member 2 thus being secured by fused polymeric material to each pedestal portion 19 of the side wall portion 4, in the fashion seen in FIG. 4.

In the completed cap upstanding tubular portion 8 coacts with side wall portion 3 and wall 6 of body 1 to define a relatively large annular mist chamber indicated at A, FIG. 1. Similarly, partition 13 and side wall portion 4 of body 1 coact to define an annular mist chamber indicated at B, FIG. 1. Mist chamber A is in communication with the interior of the battery via slots 11, opening 12, and opening 7. Mist chamber B is in communication with mist chamber A via the slots 16.

With closure member 2 secured to body 1 as earlier described, each surface portion 20, the corresponding adjacent pair of rounded ends 21, and the adjacent peripheral portion of surface 27 coact to define a thin slot S having the critical height $a$, FIG. 4, which communicates between annular chamber B and the atmosphere and which directs gases from the battery radially outwardly from the cap. When the battery gases during charging, the increased internal pressure of the battery will cause the gases to flow into the cap via opening 7, thence into chamber A via slots 11 and opening 12, thence via slots 17 into annular chamber B, and finally out through the slots S. So long as the dimension $a$ of slots S is less than 0.007 in. (0.18 mm.), so as to be significantly smaller than the flame quenching distance for a stoichiometric mixture of hydrogen and oxygen, the escaping gases will neither explode nor establish a persistent flame, even though sparks be present in the immediate vicinity of the cap. In a typical, particularly successful cap according to the invention, the exterior surface of side wall portion 4 is right cylindrical, there are sixteen of the vent slots S, the height $a$ is approximately 0.004 in. (0.102 mm.), the circumferential dimension of the slots, i.e., the circumferential distance between two adjacent pedestal portions 19, is 0.1 in. (2.5 mm.); and the total transverse cross-sectional area of all 16 slots is thus approximately 0.0064 sq. in. (4.065 sq. mm.).

Since the hydrogen-oxygen mixture passing through each slot S during charging of the battery is discharged radially outwardly in only a thin plananar fashion, the gas mixture is quickly dispersed into the atmosphere so that the concentration of hydrogen and oxygen is not sufficient to allow a persistent flame to occur.

Acid mist, i.e., droplets of liquid acid entrained in the escaping gas, will be mainly trapped in chamber A, readily wetting the surfaces which define that chamber, and therefore draining back to the battery via slots 11. Any acid mist continuing through slots 17 will be trapped within chamber B and will drain into chamber A, wetting the surfaces which define chamber D and flowing over the upper surface of shoulder 5 and through slot 17, considering the draining of liquid acid trapped in chambers A and B, it will be noted that the downwardly and inwardly slanting upper surfaces of bottom wall 6 and shoulder 5 continue as the inclined end walls of slots 11 and 17, respectively, to assure free drainage of the liquid through the slots when the cap is in its normal upright position.

Upstanding portion 8 is of substantial height, its end wall 10 being in a plane adjacent to that of shoulder 5, so that chamber A is not only of substantial volume but also of substantial axial length. Accordingly, with the cap in its upright position, an unusually large quantity of electrolyte would have to be collected in chamber A before that quantity would enter slots 17 of partition 13. Collection of such a large quantity is precluded by the fact that the total area of slots 11 is large, so that any trapped liquid acid drains rapidly back through opening 7. It is also to be noted that the slots 11 extend completely through top wall 10 and that the top wall 10 is provided with a relatively large opening 12, so that the combination of the upper portions of slots 11 and opening 12 will always provide space for free flow of gases through the cap via slots 17 even though there might be a significant quantity of liquid acid in chamber A. Under those circumstances, the outer chamber B is effective as a mist trap, and the free flow areas still remaining within the cap allow gas flow in a relatively free and unimpeded fashion so that, even if the gas flow tends to be pulsating, as when the battery is vibrated, it will not tend to pump the liquid acid into chamber B and thus into the area occupied by the slots S.

Provision of mist chambers A and B is particularly advantageous because presence of liquid in the area occupied by vent slots S would give rise to possible plugging of the vent slots by the liquid, a problem which occurs with, e.g., prior-art caps employing porous vent plugs having small capillaries.

It is also advantageous to guard against the possibility of vent slots S becoming plugged by dirt, oil, grease or other material from outside the battery. For this reason, the radial projections 24 are provided to prevent the user's fingers from contacting the periphery of closure member 2 and the external surface of side wall portion 4 in the locations occupied by the vent slots.

Another advantage of the structure shown in FIGS. 1-5 is that, with the outer diameter of member 2 essentially equal to the diameter of the outer surface of wall portion 4, the slots S in effect open through a cylindrical wall, there being no lateral overhang adjacent the vent slots. Presence of such an overhang, as when the diameter of the closure member is substantially greater than the diameter of wall portion 4, tends to increase the possibility of occurrence of a persistent flame at the mouth of the vent aperture.

With slot-like vent apertures such as apertures S, FIG. 4, the radial dimension of surfaces 20 should advantageously not exceed about five times dimension $a$. Thus, in a typical cap according to FIGS. 1-5, with the outer diameter of wall portion 4 equal to approximately 1 in. and distance $a$ kept in the range 0.003-0.005 in., the radial dimension of surfaces 20 can correspondingly be 0.015-0.025 in. (0.381-0.635mm.); and that small dimension is achieved by providing the chamfer of frusto-conical surface 18. While the effectiveness of the vent orifices in preventing persistent flames and explosions depends to some degree on keeping the radial dimension of surfaces 20 small, keeping this dimension small is more important from the standpoint of avoiding stoppage of the slot-like vent orifices by collection of liquid therein, since the dimension $a$ is so small that the vent orifices will tend to act as capillaries if the radial dimension is too large.

Members 1 and 2 can be formed of any suitable material which is acid-resistant and possesses good impact and tensile strengths, but it is particularly advantageous to employ a polymeric material of such nature as to allow members 1 and 2 to be produced by injection molding. It is particularly useful to employ a filled polypropylene of Group SE-0 or Group SE-1 flame retardant characteristics according to the Underwriters Laboratories Burning Rating Code. Typical materials having such characteristics are polypropylenes containing both an organic halogen compound, such as perchloropentacyclodecane, hexabromocyclodecane, tri-o(2,3-dibromopropyl) phosphate, and pentabromodiphenyl ether and a smaller proportion of antimony trioxide.

THE EMBODIMENT OF FIGS. 6 AND 7

Figure 7:
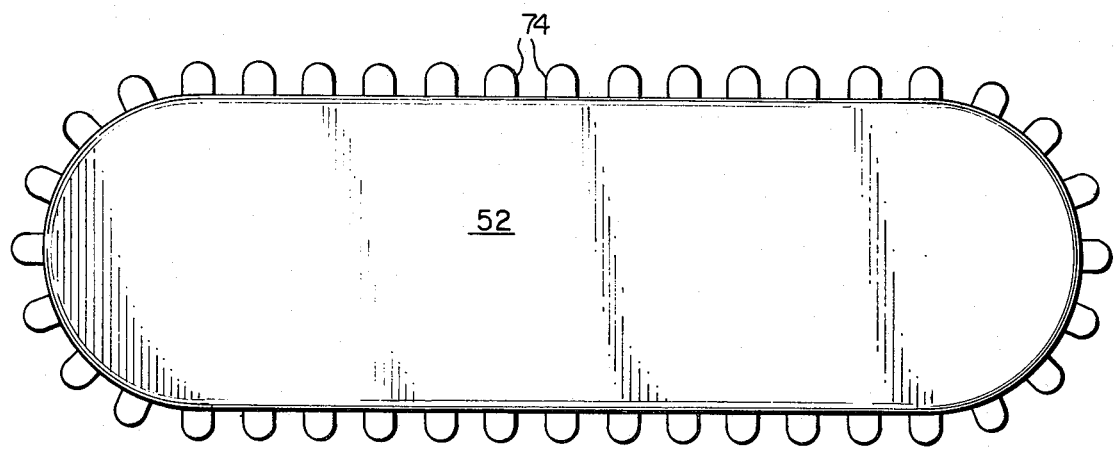
FIG. 7 is a top plan elevational view of the device of FIG. 6.

FIGS. 6 and 7 illustrate a ganged assembly of three vent caps according to the invention. The assembly includes the main body 51 and a closure 52. Body 51 includes three generally cup-shaped portions 51a, 51b, and 51c which are mutually identical and each embody elements corresponding to side wall portion 3, bottom wall 6, and upstanding portion 8 of the single cap embodiment hereinbefore described with reference to FIGS. 1–5. Portions 51a, 51b and 51c are joined integrally at their outer ends to a single wall structure 54 which, at one end, extends for 180° about the top of portion 51a, at the other end extends for 180° about the top of portion of 51c and, as seen in FIG. 7, is otherwise in the form of two straight upright walls. Between each adjacent pair of portions 51a–51c, wall portion 54 is joined by a bottom wall portion 55, FIG. 6, which also joins the adjacent upper ends of the respective portions 51a–51c.

While the inner trap chambers, within portions 51a–51c, as indicated at A', remain the same as trap chamber A, FIG. 1, the partition 63, provided on member 51, is complementary in plan shape to the outline of closure member 52. Accordingly, the second trap chamber B' also follows the general outline of the closure member, so that there is only one chamber B'. Partition 63 is provided, throughout its length, with spaced slots 67, so that the single chamber B' is in communication with all of the chambers A' via slots 67. The upper edge of wall portion 54 is formed in the same manner shown in FIG. 3, so that the peripheral portion of the lower face of closure member 52 cooperates with that edge to provide a plurality of slot-like vent orifices S' in the same fashion hereinabove described with reference to orifices S, FIG. 4. A plurality of circumferentially spaced projections 74, integral with wall 54, are provided to prevent contact between the user's fingers and slots S' and thus minimize chances that grease or oil will be applied inadvertently.

Circular shoulders 80, FIG. 6, are provided to space wall portion 54 somewhat above the top of the battery casing when the ganged assembly is in place with portions 51a–51c each inserted in a different one of three filling openings of the battery.

It will be apparent that the ganged assembly shown in FIGS. 6 and 7 operates in the same fashion hereinbefore described with reference to the embodiment of FIGS. 1–5.

THE EMBODIMENT OF FIG. 8

Figure 8:
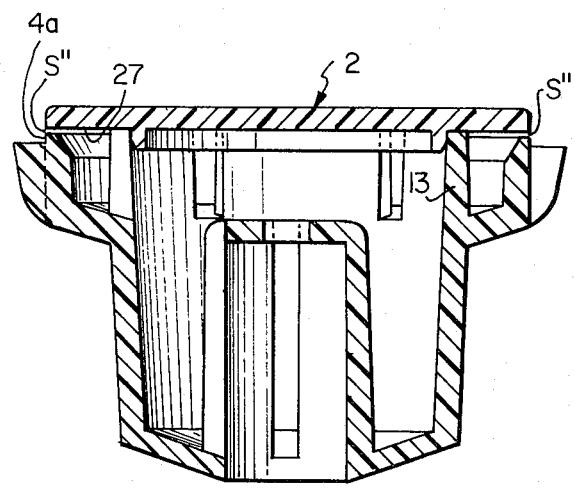
FIGS. 8 and 9 are vertical sectional views, similar to FIG. 1, illustrating additional embodiments of the invention for closing a storage battery filling opening.
Figure 9:
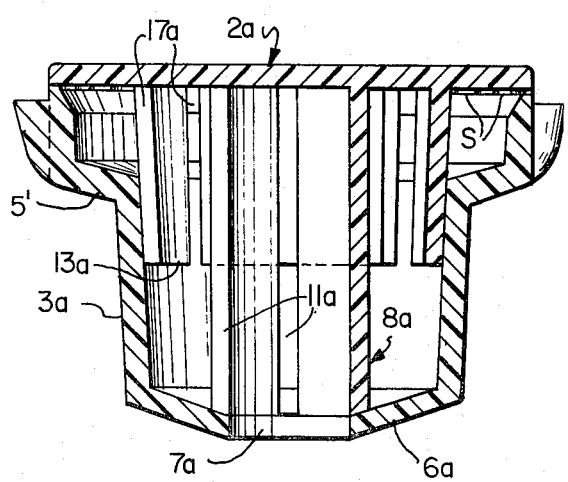

Though, when the vent orifices such as orifices S, FIGS. 1 and 4, are slot-like, the distance $a$ must be significantly less than the flame quenching distance for a stoichiometric mixture of hydrogen and oxygen, the circumferential dimension of the vent orifice is not limited and the cap can comprise a single continuous orifice extending completely therearound as seen in FIG. 8. Here, the structure is identical to that shown in FIGS. 1–5 except that the outer annular edge of wall portion 4a presents a flat planar surface spaced away from the peripheral portion of surface 27 of closure member 2 by a distance significantly less than 0.007 in. and advantageously in the range 0.003–0.005 in. Closure member 2 is secured to partition 13, as by ultrasonic welding. the outer edge of wall portion 4a and the adjacent portion of surface 27 combine to define the continuous annular vent slot S''.

THE EMBODIMENT OF FIG. 9

In this embodiment, portion 8a corresponding to portion 8, FIG. 1, is made integral with closure member 2a, as is partition 13a. Portion 8a is in the form of a cylindrical tube which extends axially for the complete distance between closure member 2a and the inner transverse annular wall 6a, the free end of tube 8a simply engaging the surface of wall 6a. Advantageously, the inner diameter of tube 8a is equal to the diameter of opening 7a in wall 6a, so that the wall of opening 7a acts as an extension of the inner surface of tube 8a. The annular end surface of tube 8a is made frusto-conical so as to be in flush engagement with the frusto-conical surface of wall 7a.

Partition 13a is longer than the distance between closure member 2a and shoulder 5', and the outer diameter of partition 13a is such that the free end portion of the partition is telescopically embraced by the inner surface of wall portion 3a, as shown.

Tube 8a is provided with a circumferentially spaced series of slots 11a with each slot extending for the full length of the tube. Similarly, partition 13a has a circumferentially spaced series of slots 17a with each slot extending for the full length of the partition. Thus, the first annular mist trap, defined by tube 8a, wall portion 3a and a partition 13a, wall 6a, and a portion of closure member 2 communicates with the interior of the storage battery via slots 11a and opening 7a when the cap is in place. The second annular mist trap is external to tube 8a and communicates with the first mist chamber via slots 17a.

Slot-like vent orifices S are provided in the same manner described with reference to FIGS. 1–5.

THE EMBODIMENT OF FIG. 10

Providing slot-like vent orifices in the manner described with reference to FIGS. 1–5 has the advantage of assuring that the relatively close manufacturing tolerances required to maintain distance $a$ of the desired value can be achieved without undue cost, and securing the closure member to the main body by ultrasonic welding is an important feature. However, the need to minimize the radial dimension of surfaces 20, FIG. 3, tends to reduce the area available for ultra-sonic welding when the entire edge of side wall portion 4 is reduced by chamferring at 18.

Figure 10:
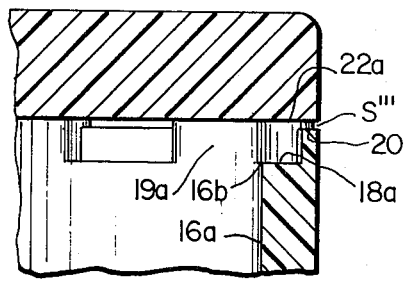
FIG. 10 is an enlarged fragmentary vertical sectional view illustrating the manner in which slot-like lateral vent apertures can be provided in accordance with another embodiment of the invention.

In the embodiment of FIG. 10, pedestal portions 19a have a radial dimension equal to the full thickness of wall portion 4a, so that the radial width of pedestal portions 19a can be, e.g., 0.06 in. (1.524 mm.), giving a substantially larger ultrasonic welding area at each pedestal portion. In order to maintain the radial dimension of surfaces 20a small, the notch between each adjacent pair of pedestal portions 19a is deepened adjacent the inner diameter of the side wall portion.

Thus, while inner surface 16a extends completely to the edge of the side wall in the location of pedestal portions 19a, surface 16a stops at an edge 16b in the location of each vent orifice, and the edge 16b is spaced from the common plane of surfaces 22a by a distance several times 0.007 in. Each edge 16b is defined by the intersection between surface 16a and a surface 18a which forms the bottom wall of the enlarged portion of the notch between the pedestal portions. Thus, though the slot-like vent orifices S''', FIG. 10, are the same as in FIGS. 1, 3 and 4, the size of the ultra-sonic welding area has been markedly increased without requiring unduly expensive machining operations when making the mold and without increasing the radial width of surfaces 20a.

THE EMBODIMENT OF FIG. 11

Figure 11:
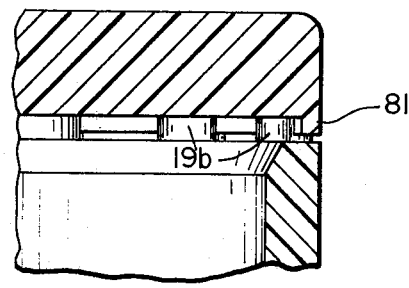
FIG. 11 is a view similar to FIG. 10 illustrating still another embodiment of the invention.

It is not essential that the pedestal portions provided to define the vent orifices be on the main body of the cap. As shown in FIG. 11, the outer annular edge of the main body can be a continuous flat circularly extending surface, and the pedestal portions 19b can be provided as part of a peripheral axially extending flange 81 on the closure member. Pedestal portions 19b have been illustrated as having the same configuration as pedestal portions 19a, FIG. 10, so that the increased area for ultra-sonic welding is retained in this embodiment without increasing the radial dimension of the vent orifice.

THE EMBODIMENT OF FIGS. 12 AND 13

Figure 12:
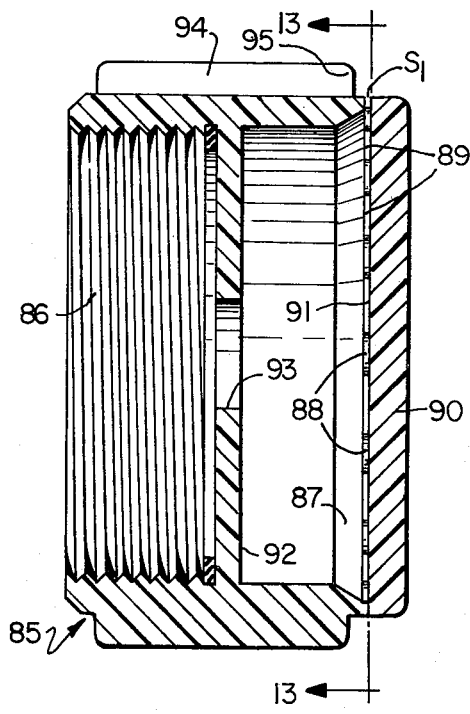
FIG. 12 is an axial sectional view of a vent cap closing an opening of a "maintenance-free" storage battery, taken generally on line 12—12, FIG. 12.
Figure 13:
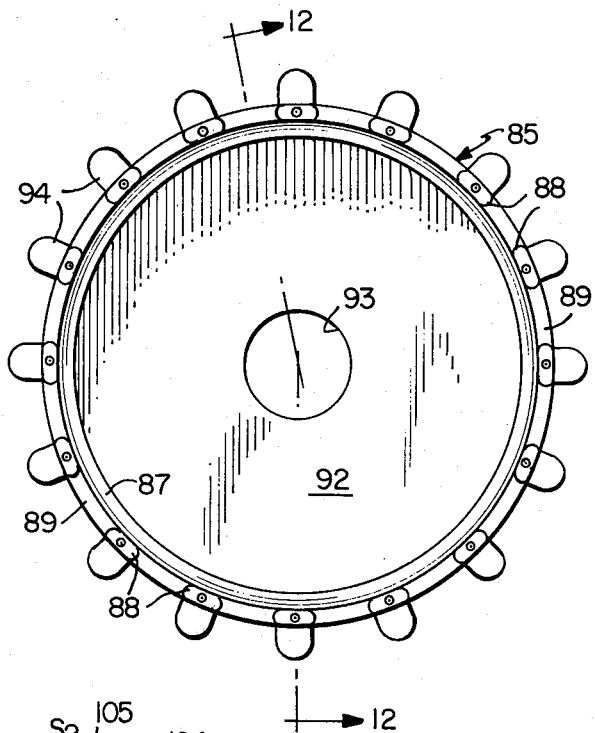
FIG. 13 is an end elevational view of the main body of the cap of FIG. 12, taken generally on line 13—13, FIG. 12.

FIGS. 12 and 13 illustrate a cap according to the invention adapted for use in closing a vent opening of a so-called "maintenance-free" automotive storage battery of the type in which the battery casing has a horizontally extending externally threaded vent (not shown).

In this embodiment, main body 85 is tubular and cylindrical, one end being internally threaded at 86 to engage the battery vent, the other end being internally chamferred at 87 to provide a radially narrow annular edge on which pedestal portions 88 are provided as hereinbefore described with reference to FIGS. 1–4, each adjacent pair of pedestal portions 88 being separated by a flat surface 89 corresponding to surface 20, FIG. 3. A circular closure disc 90 is secured to the flat surface of pedestal portions 88, the portion of the flat inner face 91 of disc 90 combining with surfaces 89 and pedestal portions 88 to define an annular series of slot-like vent orifices $S_1$ identical to the slots S, FIG. 4. A transverse wall 92, located intermediate the ends of body 85, extends across the interior of the body and is provided with a central opening 93. Wall 92, closure 90, and the portion of the annular side wall of body 85 therebetween, combine to define a chamber which communicates with the interior of the battery via opening 93 and with which the vent orifices $S_1$ all communicate. The outer surface of body 85 is formed with a circumferentially spaced series longitudinally extending, outwardly projecting ribs 94 having ends 95 lying in a common plane adjacent to the plane occupied by orifices $S_1$ to keep the user's fingers from directly engaging the mouths of the vent orifices. The diameter of disc 90 is equal to the outer diameter of the adjacent end of body 85, so that there is no overhand adjacent the vent orifices. Body 85 and disc 90 are of thermoplastic polymeric material and disc 90 is secured to pedestal portions 88 by fused polymeric material as a result of ultra-sonic welding as hereinbefore described.

THE EMBODIMENT OF FIG. 14

The vent cap of this embodiment includes the same structure described with reference to FIGS. 12 and 13 and provides a second annular series of slot-like vent orifices $S_2$ in addition to orifices $S_1$. Slots $S_1$ of this embodiment are completed by a ring 96 which has a flat end face 97 secured to pedestal portions 88. The other end face 98 of the ring is also flat. Closure member 99 has an axially projecting peripheral flange 100 formed with pedestal portions 101 which are secured to end face 98 of ring 96, pedestal portions 101 being separated by flat surfaces 102 so that the pedestal portions, surfaces 102, and the corresponding portions of end face 98 cooperate to define the orifices $S_2$. Ring 96 is chamferred at 103 adjacent end face 98 to decrease the effective radial dimension of orifices $S_2$. Closure member 99 is formed with a plurality of circumferentially spaced radial projections 104 having end faces 105 which lie in a common transverse plane spaced axially from the plane occupied by orifices $S_2$. Thus, ribs 94 and projections 104 cooperate to keep the user's fingers from contacting both sets of vent orifices.

Figure 14:
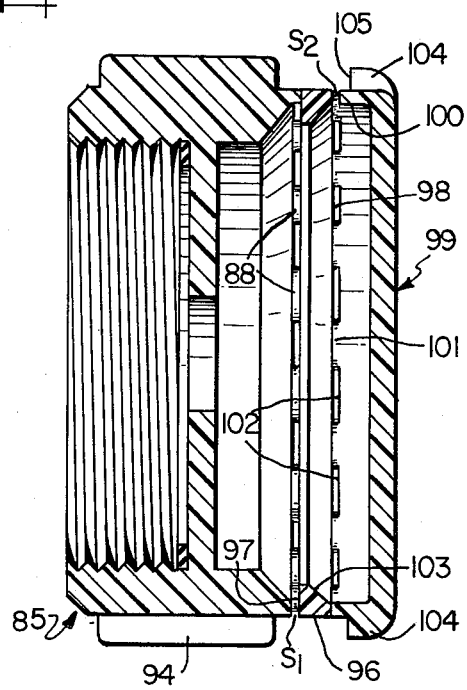
FIG. 14 is an axial elevational view of a modified form of the cap shown in FIG. 12.

As will be apparent from FIG. 14, slots $S_2$ are staggered with respect to slots $S_1$, so that each slot $S_2$ is aligned with a different one of the pedestal portions 88 rather than with one of the slots $S_1$. In this manner, no pair of slots $S_1$ and $S_2$ will discharge gases to the same area, and a better dispersal of the gases into the atmosphere is achieved. Similarly, projections 104 are staggered relative to ribs 94.

What is claimed is:

1. In an anti-explosion cap for closing at least one filling opening or vent opening of a storage battery, the combination of
    a hollow main body adapted to close at least one battery opening and comprising
        an annular side wall, and
        a transverse wall extending across the interior space defined by said annular side wall and having an opening communicating between the interior of said hollow main body and the interior of the battery when the cap is in place,
    said annular side wall having an end portion which is directed away from the battery when the cap is in place and which includes an annular surface; and
    a closure member having a portion which extends across said end portion and includes an annular portion cooperating with said annular surface to define at least one vent aperture,
        said closure member being secured to said main body to seal against escape of gas from within the cap save via said at least one vent aperture when the pressure within the battery and the cap exceeds that of the surrounding atmosphere,
        said at least one vent aperture having a dimension, in a direction transverse to gas flow through the vent aperture, which is significantly less than the flame quench distance for a stoichiometric mixture of hydrogen and oxygen, the total cross-sectional area of said at least one vent aperture, transverse to the direction of gas flow therethrough, being at least 0.0001 sq. in.

2. The combination defined in claim 1, wherein said annular surface of said side wall is the outwardly facing edge of said end portion; and said annular portion of said closure member is the peripheral portion thereof and overlies said outwardly facing edge to define said at least one vent aperture.

3. The combination defined in claim 2, wherein said at least one vent aperture is a plurality of circumferentially spaced slots having a uniform dimension, axially of the cap, less than 0.007 in.

4. The combination defined in claim 3, wherein said peripheral surface portion of said closure member is flat and lies in a plane transverse to the cap; said slots are defined by outwardly opening notches in said outwardly facing edge of said main body; adjacent pairs of said notches being separated by pedestal portions each having a flat end surface; said main body and said closure member are of polymeric material; and said flat peripheral surface of said closure member is secured to each of said flat end surfaces by fused polymeric material.

5. The combination defined in claim 3, wherein the outer end of said annular wall of said main body is chamfered at its open end, whereby said outwardly facing edge of said main body as a radial width substantially smaller than the radial thickness of said annular wall locations inwardly of the chamfer and the radial dimension of said slots is therefore a predetermined small dimension.

6. The combination defined in claim 5, wherein said radial dimension does not exceed about five times said uniform dimension of said slots.

7. The combination defined in claim 3, wherein the outer end of said annular side wall has a cylindrical outer surface; and said closure member has a cylindrical periphery of essentially the same diameter as the cylindrical outer surface of said annular side wall.

8. The combination defined in claim 3, wherein said outwardly facing edge of said annular side wall is flat; said closure member has a peripheral flange projecting axially inwardly; said slots are defined by inwardly opening notches on said peripheral flange; adjacent pairs of said notches being separated by pedestal portions each having a flat end surface; said main body and said closure member are of polymeric material; and said outwardly facing edge of said annular side wall is secured to each of said flat end surfaces by fused polymeric material.

9. The combination defined in claim 8, wherein the inner surface of said annular wall of said main body is chamfered, whereby said outwardly facing edge has a radial thickness substantially smaller than that of said annular wall in locations inwardly of the chamfer and the radial dimension of said slots is therefore a predetermined small dimension.

10. The combinaton defined in claim 9, wherein said radial dimension of said slots does not exceed about five times said uniform dimension of said slots.

11. The combination defined in claim 1, wherein said at least one vent opening is a continuous circumferential slot having a uniform dimension, axially of the cap, not significantly exceeding 0.007 in.

12. The combination defined in claim 11, further comprising a tubular partition forming part of said main body, said partition being of smaller transverse dimension than said annular side wall and spaced inwardly therefrom, the outer end of said partition presenting an annular outwardly facing end; said closure member having a flat surface secured to said end of said partition.

13. The combination according to claim 1, wherein said annular side wall comprises an inner portion dimensioned to be embraced by the wall of a filling opening of the battery, an outer portion of larger diameter than said inner portion, and a generally transverse annular shoulder portion interconnecting said inner and outer portions; the combination further comprising a tubular partition disposed concentrically within said outer, larger diameter portion of said annular side wall, said tubular partition being of such size, shape and location as to constitute an approximate extension of said inner portion of said annular side wall and therefore cooperate with said annular shoulder and said outer, larger diameter portion of said annular side wall to define an outer annular trap chamber, said tubular partition having a circumferentially spaced series of slots which communicate between said outer annular trap chamber and the space within said inner portion of said annular side wall, said at least one vent aperture communicating with said outer annular trap chamber.

14. The combination according to claim 13, wherein said tubular partition is integral with said main body and projects from said shoulder toward said closure member; said shoulder has an annular surface which faces said closure member and is frusto-conical, tapering toward said inner portion of said annular side wall and the central axis of the cap; said slots in said tubular partition extend from said shoulder through the outer end of the partition; and the inner ends of said slots constitute extensions of the frusto-conical surface of said shoulder.

15. The combination defined in claim 13, wherein said tubular partition is integral with said closure members and extends therefrom to a point beyond said shoulder, the portion of said partition which extends beyond said shoulder being embraced by said inner portion of the annular side wall of said main body, said slots opening through the free end of said partition and extending at least a substantial distance beyond said shoulder.

16. The combination defined in claim 13, wherein said transverse wall is located at the inner end of said inner portion of said annular side wall of said main body; and said opening in said transverse wall is located at the center thereof; the combination further comprising a second tubular partition surrounding said opening and extending from said transverse wall for at least a major portion of the distance from said transverse wall to said closure member, said second tubular partition having a plurality of circumferentially spaced slots communicating between the interior of said second tubular partition and the space between that partition and said inner portion of said annular side wall of said main body.

17. The combination defined in claim 16, wherein said second tubular partition is integral with said transverse wall;

said transverse wall has an annular surface which faces toward said closure member and is frusto-conical, tapering toward the central axis of the cap and away from said closure member; and said slots in said second tubular partition extend for the full length thereof and have end walls which form continuations of said frusto-conical surface of said transverse wall.

18. The combination defined in claim 16, wherein said second tubular partition is integral with said closure member and extends into engagement with said transverse wall.

19. The combination defined in claim 2, wherein said outwardly facing edge of said annular side wall is flat;

said peripheral portion of said closure member is in the form of an annular flange which projects from said closure member axially toward said main body, said flange having a circumferentially spaced series of notches opening toward said outwardly facing edge of said annular side wall, adjacent pairs of said notches being separated by pedestal portions each having a flat end surface;

said main body and said closure member are of polymeric material; and said flat end surfaces of said pedestal portions of said closure member are secured by fused polymeric material to said outwardly facing edge of said annular side wall, said notches and the respective opposing portions of said outwardly facing edge of said annular side wall cooperating to define vent apertures.

20. The combination defined in claim 2, wherein said annular side wall of said main body comprises a main portion having an annular outwardly facing edge, and a ring portion having an inwardly facing edge and an outwardly facing edge;

said main portion of said annular side wall, said ring portion of said annular side wall, and said closure member are of polymeric material;

one of said outwardly facing edge of said main portion of said side wall and said inwardly facing edge of said ring portion of said side wall is provided with a circumferentially spaced series of notches, each adjacent pair of said notches being separated by a pedestal portion and said ring portion and said main portion being secured together by fused polymeric material at said pedestal portions;

said peripheral portion of said closure member overlies said outwardly facing edge of said ring portion;

one of said outwardly facing edge of said ring portion and said peripheral portion of said closure member is provided with a circumferentially spaced series of notches, each adjacent pair of said last-mentioned notches being separated by a pedestal portion having a flat end surface; and said closure member and said ring member are secured together by fused polymeric material at said last-mentioned pedestal portions.

21. The combination defined in claim 2, wherein the outer periphery of said closure member and the outer surface of said outwardly facing edge of said annular side wall have essentially the same shape and transverse dimension; and said annular side wall has a circumferentially spaced series of radial external projections located adjacent said at least one vent aperture whereby, when one grasps the cap to manipulate the same, foreign matter will not be applied to said at least one vent aperture.

22. The combination defined in claim 2, wherein said main body and said closure member are of polymeric material;

said at least one vent opening comprises a plurality of vent slots spaced apart circumferentially of the cap;

the space between said annular surface of said side wall and said peripheral portion of said closure member does not significantly exceed .007 in.; and said main body and said closure member are secured together by fused polymeric material in areas located between adjacent pairs of said vent slots.

23. In an anti-explosion cap for closing a plurality of filling openings or vent openings of a storage battery, the combination of a hollow main body comprising a plurality of annular side wall portions each adapted to close a different one of the battery openings, said annular side wall portions being spaced apart according to the spacing of the battery openings to be closed, a plurality of transverse walls each extending across the interior space defined by a different one of said annular side wall portions, each of said transverse walls having an opening communicating between the interior of said hollow main body and the interior of the battery when the cap is in place, a common wall portion disposed at the ends of said annular side wall portions which are directed away from the battery when the cap is in place, and intermediate transverse wall portions disposed between and joining adjacent ones of said annular side wall portions, said annular side wall portions, said transverse walls, said common wall portion and said intermediate transverse wall portions being integrally joined to constitute said hollow main body, all portions of said common wall portion lying in planes which extend away from the battery when the cap is in place, said common wall portion extending in closed fashion to enclose the space adjacent said ends of said annular side wall portions, said intermediate transverse wall portions being spaced inwardly from the outer edge of said common wall portion; and a closure member extending across the interior space defined by said common wall portion, said closure member and said common wall portion having surfaces which cooperate to define at least one vent aperture, said closure member being secured to said main body to seal against escape of gas from within the cap save via said at least one vent aperture when the pressure within the battery and the cap exceeds that of the surrounding atmosphere, said at least one vent aperture having a dimension, in a direction transverse to gas flow through the vent aperture, which is significantly less than the flame quench distance for a stoichiometric mixture of hydrogen and oxygen and a total cross-sectional area, transverse to the direction of gas flow therethrough of at least 0.001 sq. in.

* * * * *

UNITED STATES PATENT OFFICE
CERTIFICATE OF CORRECTION

PATENT NO. : 3,992,226

DATED : November 16, 1976

INVENTOR(S) : James B. Godshalk

It is certified that error appears in the above-identified patent and that said Letters Patent are hereby corrected as shown below:

Claim 1, last line, change "0.0001" to --0.001--

Signed and Sealed this

Fifteenth Day of February 1977

[SEAL]

Attest:

RUTH C. MASON
*Attesting Officer*

C. MARSHALL DANN
*Commissioner of Patents and Trademarks*